United States Patent
Vogel et al.

(10) Patent No.: US 8,713,446 B2
(45) Date of Patent: Apr. 29, 2014

(54) PERSONALIZED DASHBOARD ARCHITECTURE FOR DISPLAYING DATA DISPLAY APPLICATIONS

(75) Inventors: Andreas Vogel, Rauenberg (DE); Dominic Hehn, Speyer (DE); Mathias Zietzschmann, Sandhausen (DE); Andreas Michael Kunstein, Rauenberg (DE); Sigo Henkel, Heidelberg (DE); Susanne Gottlieb, Karlsruhe (DE); Andrei Tsognov, Nussloch (DE); Steffen Maier, Mauer (DE)

(73) Assignee: SAP AG, Walldorf (DE)

( * ) Notice: Subject to any disclaimer, the term of this patent is extended or adjusted under 35 U.S.C. 154(b) by 78 days.

(21) Appl. No.: 13/187,778

(22) Filed: Jul. 21, 2011

(65) Prior Publication Data

US 2013/0024760 A1    Jan. 24, 2013

(51) Int. Cl.
*G06F 3/00* (2006.01)

(52) U.S. Cl.
USPC .......................................... 715/744; 715/746

(58) Field of Classification Search
USPC .................................. 715/744, 746
See application file for complete search history.

(56) References Cited

U.S. PATENT DOCUMENTS

| | | | |
|---|---|---|---|
| 2004/0066414 A1* | 4/2004 | Czerwinski et al. | 345/781 |
| 2005/0138081 A1* | 6/2005 | Alshab et al. | 707/200 |
| 2007/0106705 A1* | 5/2007 | Chalana | 707/201 |
| 2009/0024944 A1* | 1/2009 | Louch et al. | 715/765 |
| 2009/0119280 A1* | 5/2009 | Waters et al. | 707/5 |
| 2009/0158189 A1* | 6/2009 | Itani | 715/772 |
| 2009/0319931 A1* | 12/2009 | Hutchings et al. | 715/771 |
| 2011/0047540 A1* | 2/2011 | Williams et al. | 717/178 |
| 2011/0055736 A1* | 3/2011 | Kang et al. | 715/760 |
| 2011/0320395 A1* | 12/2011 | Dada et al. | 706/47 |
| 2012/0005542 A1* | 1/2012 | Petersen et al. | 714/48 |
| 2012/0016678 A1* | 1/2012 | Gruber et al. | 704/275 |
| 2012/0180029 A1* | 7/2012 | Hill et al. | 717/135 |

* cited by examiner

*Primary Examiner* — Laurie Ries
*Assistant Examiner* — Soumya Dasgupta
(74) *Attorney, Agent, or Firm* — Schwegman Lundberg & Woessner, P.A.

(57) ABSTRACT

In an embodiment, a method of providing a personalized display of data is presented. In this method, an identity of each of multiple applications for displaying data is transmitted to a user device, such as, for example, a computer or mobile communication device. Selections of more than one of the multiple applications are received from the user device. Configuration data indicating the selected applications are generated and stored. A request for a presentation application is received from the user device. The presentation application is to display the data via execution of the selected applications. In response to the request, the presentation application is generated based on the configuration data, and includes the selected applications. The presentation application is then transmitted to the user device for execution.

25 Claims, 10 Drawing Sheets

PERSONALIZED DASHBOARD ARCHITECTURE FOR DISPLAYING DATA DISPLAY APPLICATIONS

FIELD

The present disclosure relates generally to the display or presentation of information. In an example embodiment, the disclosure relates to the presentation or display of business information, such as, for example, key performance indicators (KPIs) relating to one or more business functions, the presentation or display being personalized for a particular user.

BACKGROUND

Given the often complex nature of many business operations or entities, the task of monitoring salient aspects of such organizations is typically daunting. Such may be the case even for relatively small business entities, which may have significant product development, manufacturing, distribution, sales, marketing, financial, and other business-related functions operating collectively toward one or more corporate goals. For decision-makers to monitor such an organization, businesses may provide a business information "dashboard," which is typically a web page or other computer-based presentation providing a number of important business metrics, KPIs, and/or the like presented simultaneously in an easily digestible format. The information may be presented in any number of formats, such as graphs, tables, charts, individual numerical values, and the like. The viewer of such information may then react to the metrics by modifying or redirecting one or more of the business functions to remedy operational problems, improve overall business performance, and so on.

Generally, within a business organization, a set of dashboards may be specifically designed and employed to present predetermined types of data to the decision-makers of an organization. As a result, the types of information presented in a particular dashboard are generally static in nature over time, and present the same information to similarly situated employees or managers of the organization. Also, given their static nature, a dashboard is often designed to be displayed on a typical computer monitor, given the significant amount of data often presented within a dashboard.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

At least some of the embodiments described herein provide various techniques for the personalized display of data, such as data associated with various aspects of a business, including, but not limited to, product design and development, manufacturing, distribution, marketing, sales, information technology, and employee pay and benefits administration. Such data may be displayed textually, graphically, or via other visual means, and the presentation thereof may be referred to as a "dashboard" display. In some examples, any data other than data associated with a business organization or entity may also be presented or displayed in the same manner as described below. As a result, each user, by way of a user device (such as, for example, a desktop computer, laptop computer, tablet computer, smart phone, or personal digital assistant (PDA)) may configure a personalized dashboard for the presentation of data of particular interest to the user.

As is described in greater detail below with respect to some embodiments, the user may select any number of predefined data display applications for integration into a single dashboard display, sometimes referred to herein as a "presentation application," "dashboard container application," "dashboard application," "dashboard container," and the like. The user may also configure each of the applications, as well the overall dashboard display, with respect to the type of data presented, time periods corresponding to the data, the format of the data presentation, and other parameters. In addition, the user may access and view the same personalized dashboard on a variety of devices. Other aspects of the embodiments discussed herein may be ascertained from the following detailed description.

Figure 1:
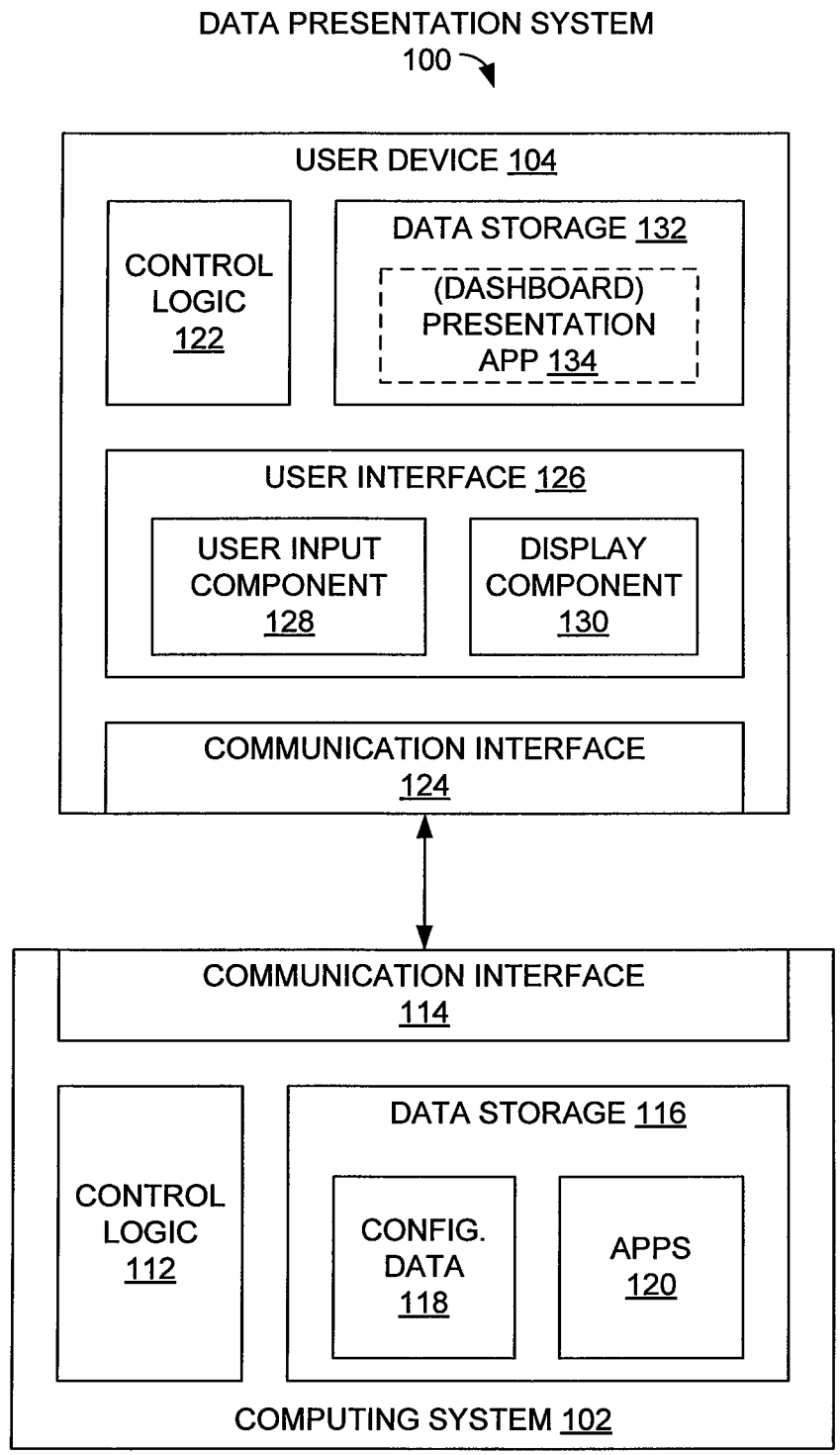
FIG. 1 is a block diagram of an example system for presenting a personalized data display.

FIG. 1 is a block diagram of an example data presentation system 100 for the configuration and presentation of data that is personalized by and for a user. In this example, the data presentation system 100 includes a computing system 102 and a user device 104, although multiple such systems and devices 102, 104 may be coupled to each other to form the data presentation system 100. Generally, the computing system 102 is configured to facilitate the generation and configuration of the personalized data presentation, and to acquire the data forming the basis of the presentation, while the user device 104 is employed by a user to communicate with the computing system 102 to configure, access, and view the resulting personalized presentation. Examples of the computing system 102, include, but are not limited to, communication servers, such as web servers, which may be integrated or coupled with one or more data sources, such as, for example, data warehouses and relational database systems. Examples of the user device 104 may include, but are not limited to, desktop and laptop computers, tablet computers, PDAs, smart phones, and any other device or system capable of configuring and displaying the personalized data presentation to a user in a graphical and/or textual format.

The computing system 102 may include control logic 112, a communication interface 114, and data storage 116. The control logic 112 may include one or more processors configured to execute instructions that cause the processors to perform the various operations associated with the computing system 102 that are described in greater detail below. In other examples, the control logic 112 may include hardware, software, firmware, or any combination thereof.

The communication interface 114 may be configured to facilitate communication with one more user devices 104 by way of a communication connection, such as, for example, a local area network (LAN) connection (such as an Ethernet connection or an IEEE 802.11x (WiFi®) connection), a wide area network (WAN) (such as the Internet), or another wired or wireless communication connection.

The data storage 116 may store configuration data 118 for each of a number of users that describes one or more aspects of a presentation application to be generated and transmitted to the user device 104 for presentation to the user. In one example, the configuration data 118 describe personalized aspects of the presentation application chosen by the user, such as the identity of the separate data display applications to be incorporated within the dashboard presentation application, the values of the parameters utilized to further define the data being presented via the included applications, and so on. The data storage 116 may also include the applications 120 themselves, any one or more of which may be referenced in the configuration data 118 for inclusion in a personalized presentation application or dashboard display for a particular user. The data storage 116 may include either or both volatile data storage (such as, for example, static or dynamic random-access memory (RAM)) and/or non-volatile data storage (such as, for example, flash memory, hard disk drive (HDD) memory, optical disk drive (ODD) memory, and solid state disk (SSD) memory).

Communicatively coupled with the computing system 102 is the user device 104, which may include control logic 122, a communication interface 124, a user interface 126, and data storage 132. In some implementations, examples of the control logic 122, the communication interface 124, and the data storage 132 may be similar to those described above for the control logic 112, the communication interface 114, and the data storage 116 of the computing system 102. The user interface 126, as shown in FIG. 1, may include a user input component 128 and a display component 130. In an example, the user input component 128 may be any component or structure by which the user may enter input into the user device 104, such as by way of textual, graphical, or other means, including, but not limited to, a keyboard, touchpad, touch screen, mouse, and the like. The display component 130 provides output to the user of the user device 104 by way of a liquid crystal display (LCD) or other visual display means. In some examples, the user input component 128 and the display component 130 may be combined into a single component or device, such as a touch screen.

In one example, the control logic 122 of the user device 104 may be configured to receive input from the user of the user device 104 for personalizing a dashboard application 134 for the user, and for requesting the downloading of the resulting dashboard application 134 from the computing system 102 for execution on the user device 104. As a result, the user may view data of particular interest, such as one or more of the types of business data enumerated above, via the display component 130 of the user device 104.

Figure 2:
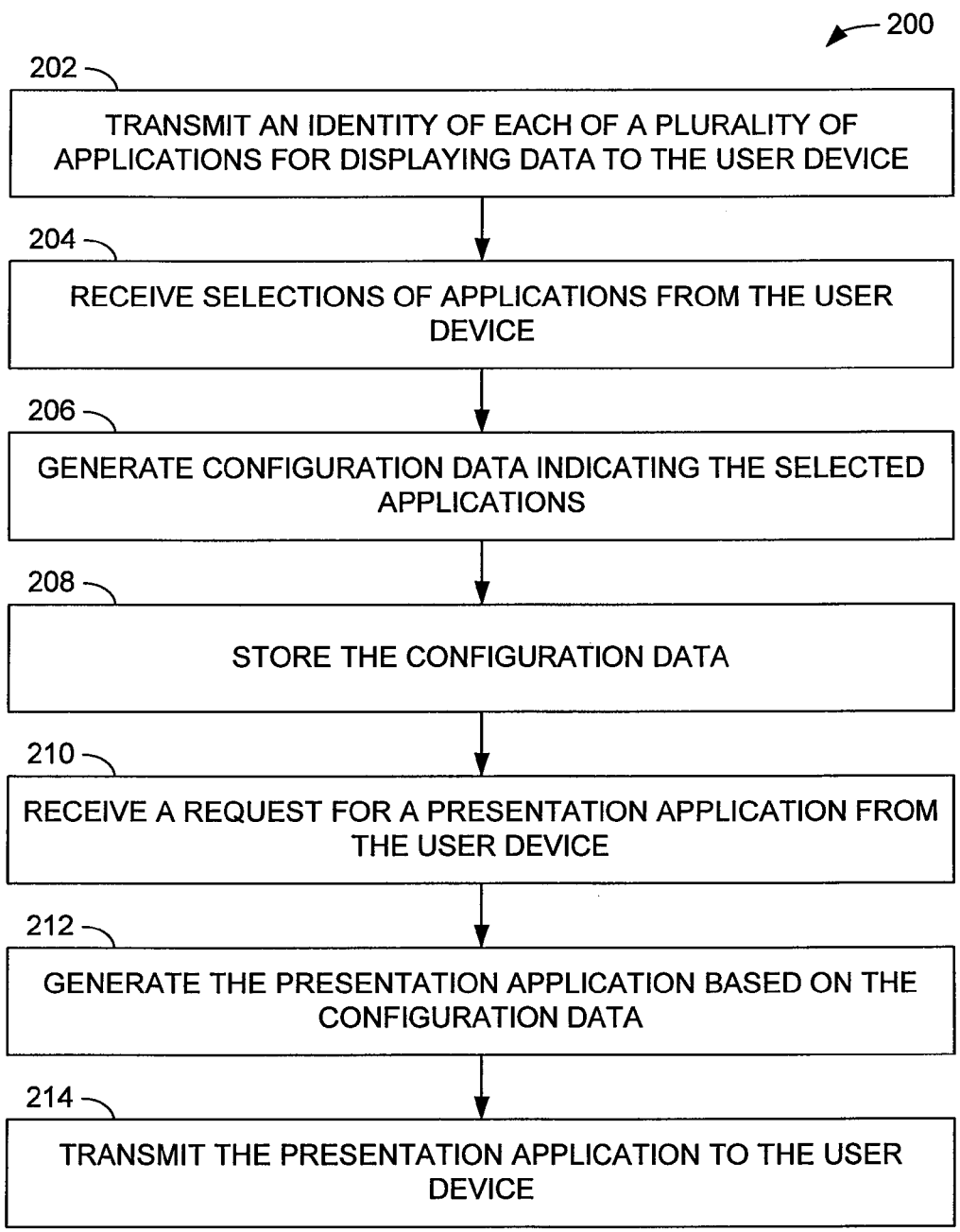
FIG. 2 is a flow diagram of an example method of configuration and presentation of a personalized data display.

FIG. 2 is a flow diagram of an example method 200 for the configuration and presentation of a personalized data display. In one example, the computing system 102 of FIG. 1 may be employed to perform the method 200. However, other systems not specifically described herein may also be adapted to perform the operations disclosed in FIG. 2. In the method 200, an identity of each of a plurality of applications for displaying data is transmitted to the user device 104 (operation 202). Selections of more than one of the applications are received from the user device 104 (operation 204). Configuration data indicating the selected applications is generated (operation 206) and stored (operation 208). A request for a presentation or dashboard application is then received from the user device 104 (operation 210). In response to the request, the presentation application is generated based on the configuration data (operation 212), and the presentation application is transmitted to the user device 104 (operation 214) for operation thereon. While the operations of FIG. 2 and other figures provided herein are shown in a specific order, other orders of operation, including possibly concurrent execution of at least portions of one or more operations, may be possible in some implementations.

As a result of the method 200, the user may cause the generation of a personalized dashboard application by at least selecting multiple preexisting data display applications to be included in the dashboard. The user may then request the download and execution of the generated dashboard application to the user device 104, as well as other user devices not specifically described herein. Further, as is described in greater detail below, the configuration and execution of the dashboard application does not involve specialized enabling software to be installed on the user device 104, and the dashboard application is deleted at the user device 104 upon execution completion.

Figure 3:
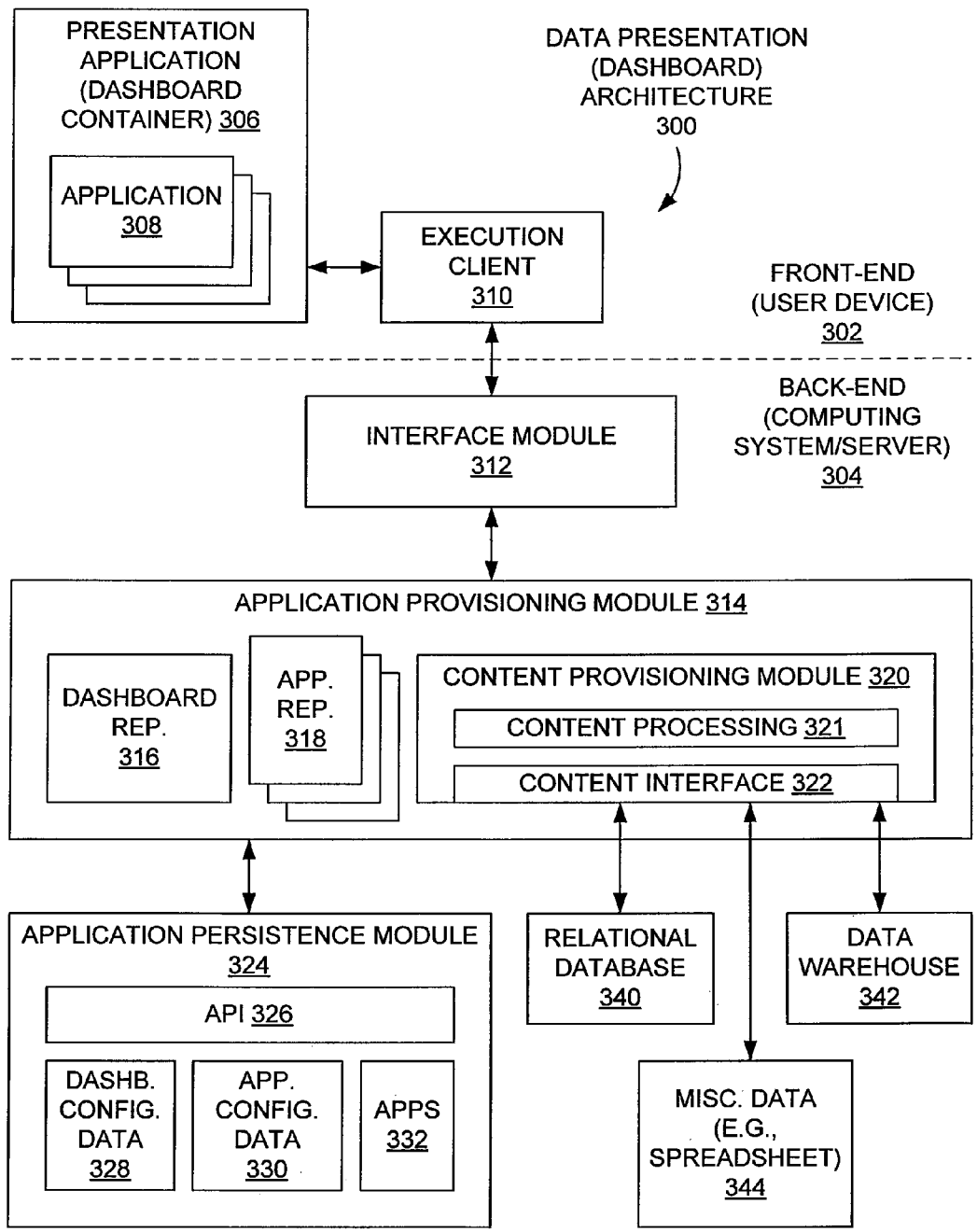
FIG. 3 is a block diagram of an example system architecture for personalized data presentation.

FIG. 3 is a block diagram of an example data presentation architecture 300 implementable in a data presentation system, such as the data presentation system 100 of FIG. 1. The following discussion describes a number of modules that, in one example, are embodied as groups of software instructions executable on one or more processors. In other examples, such modules may include hardware, software, firmware, or some combination thereof. Additionally, the architecture 300, as shown in FIG. 3, is divided into a front-end portion 302 implemented in a user device (such as the user device 104 of FIG. 1), and a back-end portion 304 implemented on a computing system or server (such as the computing system 102 of FIG. 1), possibly along with any number of database systems and other supporting computer systems.

In the front-end portion 302, an execution client 310 is responsible for executing the presentation application 306, which may be viewed as a "dashboard container application," "dashboard container," "dashboard application," and the like, incorporating multiple data display applications 308, wherein the presentation application 306 has been downloaded from the back-end portion 304 for execution on a user device 104, as described above. In one example, the dashboard container application 306 may be one or more Adobe® Flash® files executable by way of a Flash Player, such as the Flash Player plug-in for Microsoft® Windows® Internet Explorer®, serving as the execution client 310. Thus, in this example, the dashboard application 306 may be downloaded and executed by way of accessing a webpage via a Uniform Resource Locator (URL) corresponding to the dashboard application 306. In some examples, the specification and/or configuration of the dashboard application 306, as described more fully below, may also be performed via the same or similar web-based mechanism.

In a specific Flash implementation, the dashboard application 306 conforms to the SAP® Web Dynpro® programming model for web-based user interfaces to SAP business applications. Moreover, the individual data display applications 308 incorporated within the dashboard container application 306 may be programmed using the SAP Crystal Solutions® (formerly Xcelsius®) dashboarding and data visualization software.

In other examples, the dashboard application 306 may be specified via one or more files formatted according to another interface standard, such as, for example, HTML (HyperText Markup Language) Version 5, which may be implemented on a variety of user devices, including mobile devices. In yet other implementations, other web-based or non-web-based user interface technologies may be employed for the dashboard application 306 and the execution client 310. As a result, a user may view the same dashboard display on different display platforms, such as, for example, desktop and laptop computers, smart phones, PDAs, and tablet computers.

In the back-end portion 304 of the architecture 300, the interface module 312 may be configured to support the user interface aspects of the dashboard application 306 being executed at the user device 104. In the Web Dynpro example mentioned above, the interface module 312 may incorporate a Web Dynpro controller that performs data conversions and processing between the dashboard application 306 executing on the user device 104 (which may be referred to as a user "view" accessible via a web browser) and an interface to the actual data that is being presented to the user via the dashboard application 306 (which may be termed a "model"). In other examples, the interface module 312 may be any logic that supports the processing (such as, for example, conversion or translation) of data to a form usable by the execution client 310 for presentation to the user in the dashboard application 306. Additionally, the interface module 312 may also be configured to receive configuration information for the generation of the dashboard container application 306, such as, for example, the selection of the data display applications 308 to be included in the dashboard application 306.

The application provisioning module 314 of the back-end portion 304 may be configured to provide one or more services to a user of the user device 104 pertaining to the dashboard container application 306 and the incorporated data display applications 308. These services may include, but are not limited to, the generation of the dashboard container application 306, the storage of the configuration data used to generate the dashboard 306, the collection and possible processing of the data to be presented via the multiple data display applications 308, and the transmission of that data via the interface module 312 to the user device 104 for presentation to the user via the dashboard 306.

As shown in FIG. 3, the application provisioning module 314 may maintain an internal representation 316 of the dashboard container application 306, as well as internal representations 318 of one or more of the data display applications 308 included in the dashboard application 306. In one example, the representations 316, 318 may allow the application provisioning module 314 to identify the data to be retrieved, as well as the type of processing to be applied to the retrieved data, the format of the data for transmission via the interface module 312 to the user device 104, and the like. The dashboard representation 316 and the representations 318 of the individual data display applications 308 may serve additional purposes in other embodiments.

The application provisioning module 314 may also include a content provisioning module 320, which may be configured to retrieve and process the data desired for presentation to the user via the dashboard container application 306. As depicted in FIG. 3, the content provisioning module 320 may include a content processing module 321 and a content interface 322. In one example, the content interface 322 may be configured to retrieve data from a number of sources, including, but not limited to, a relational database 340, a data warehouse 342, and miscellaneous data sources 344 (such as, for example, a Microsoft® Excel® spreadsheet). Generally, a data warehouse is a type of database that contains data that is uploaded from operational business systems primarily for reporting purposes. An example of a data warehouse is a database operated as an SAP Business Warehouse® (BW). Thus, in some examples, the content interface 322 may issue one or more database or data warehouse queries in order to receive responses that include the desired data to be presented ultimately to the user of the user device 104. Other methods by which the data is retrieved may be employed in other examples, and such methods may depend on the particular data source involved. As noted above, the retrieved data may include key performance indicators (KPIs) and other data related to business operations. In other examples, the data may not be restricted to business data, but may include any data or information of interest to a user, such as stock price information, sports statistics, and so on.

The content processing module 321 may be configured to perform any processing desired for the data retrieved by the content interface 322. Examples of such processing may include, but are not limited to, filtering the retrieved data (such as according to time, value, or other factors), composing or formatting the data, correlating at least portions of the data with other data, aggregating one or more data items (such as by addition or other mathematical or logical operations), and configuring the data for a particular purpose or objective. One example of such data configuration associated with data processing or communication performance may be service level agreement (SLA) configuration, wherein the data may be organized or processed so that the data may be compared with various requirements stated in a particular SLA to determine compliance with the SLA. In other examples, the content processing module 321 may perform any type of processing on the retrieved data, and then forward the processed data to the interface module 312 for transmission to the client device 104 for presentation to the user via the dashboard container application 306.

In some examples, the application provisioning module 314 may provide additional services relating to the dashboard container application 306, such as, for example, the customization and personalization of the dashboard container application 306 and the individual data display applications 308, development (possibly including tracing and debugging) of the data display applications 308, language localization and translation of the dashboard container application 306 and the individual data display applications 308, and/or authorization for access to the dashboard container application 306 and the individual data display applications 308.

The application persistence module 324 of the back-end portion 304 may include any data useful in generating the dashboard container application 306. As illustrated in FIG. 3, such information may include, but is not limited to, configuration data 328 for the dashboard application 306, configuration data 330 for each of the data display applications 308 incorporated within the dashboard container application 306, and the individual data display applications 308. In one example, the data display applications 332 may be stored as Flash files in a form ready for execution within the dashboard container application 306. As described herein, at least some of this information may be provided by the user of the user device 104 via the interface module 312 and the application provisioning module 314. To facilitate the storage and retrieval of the various data 328, 330 and applications 332, the application persistence module 324 may provide at least one application programming interface (API) 326 for those purposes in order to protect the integrity of the data 328, 330 and applications 332.

Figure 4:
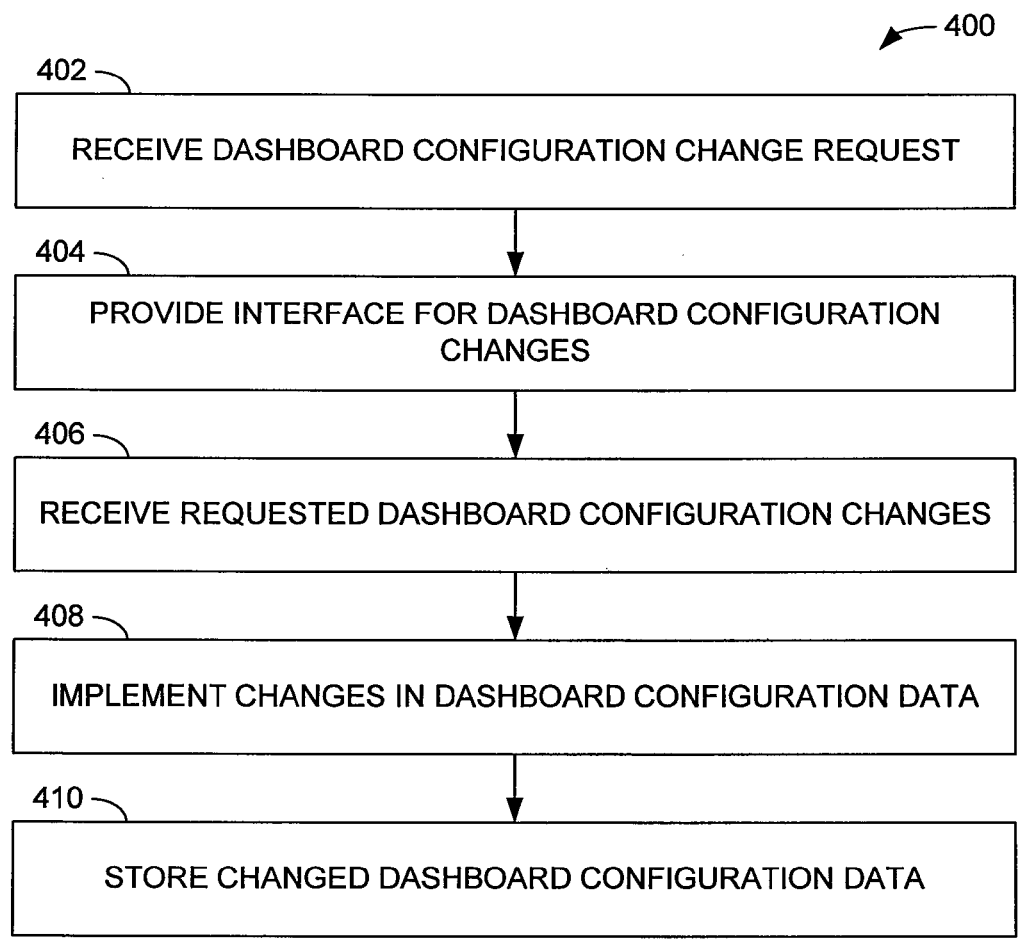
FIG. 4 is a flow diagram of an example method of receiving and implementing changes for a personalized dashboard display.

FIG. 4 is a flow diagram of a method 400 for receiving and implementing changes for a personalized dashboard display, which may include the initial generation and subsequent modification of a dashboard container application 306 (FIG. 3). In the method 400, a dashboard configuration change request may be received (operation 402). In response to the request, a graphical interface (such as, for example, a dialog box associated with, or presented within, a webpage) providing for the entry of configuration changes for the dashboard container application 306 may be presented to the user (operation 404). One or more requested changes for the configuration of the dashboard container application 306 may be received via the provided interface (operation 406). The requested changes may then be implemented in the configuration data 328 for the dashboard container application 306, as well as the configuration data 330 for any of the data display applications 308 (operation 408). The changed dashboard configuration data 328, as well as any changed configuration data 330 for the individual data display applications 308, may be stored in the application persistence module 324 (operation 410).

Figure 5:
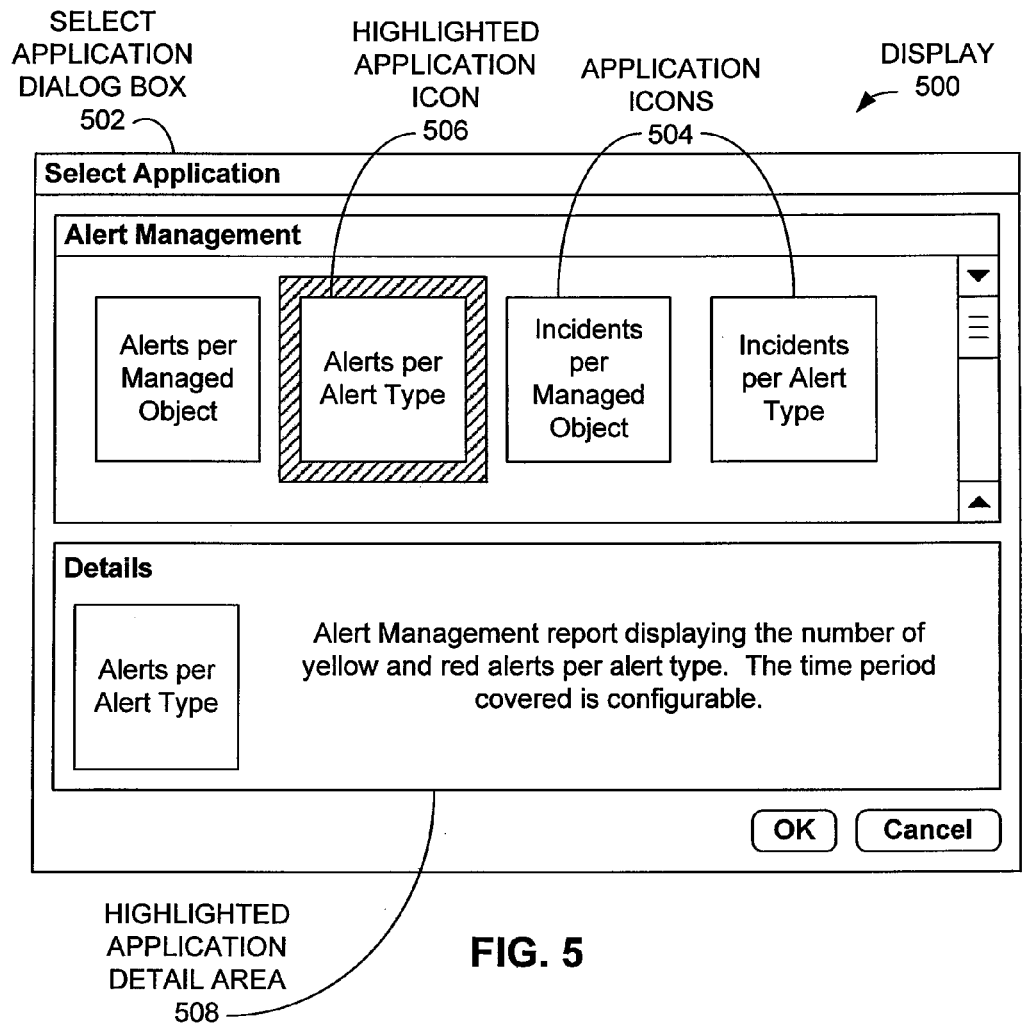
FIG. 5 is a graphical representation of an example display for selecting individual applications for a personalized dashboard display.

FIG. 5 is a graphical representation of a display 500 (for example, a graphical user interface) for implementing changes for a personalized dashboard display, as discussed in the method 400 of FIG. 4. In this specific example, a "select application" dialog box 502 accessed via a website presents several application icons 504, wherein each icon 504 represents a data display application 308 that may be added to a dashboard container application 306. In the example of FIG. 5, one of the application icons 504 is highlighted by the user (the highlighted application icon 506), for which details describing the type of data presented by the associated application are displayed in a highlighted application detail area 508. The user may then click the "OK" button to select the highlighted application icon 506, thus including the associated data display application 308 in the dashboard container application 306. The specific example of FIG. 5 provides a number of alert management applications (such as "alerts per managed object," "alert per alert type," incidents per managed object," and "incidents per alert type") applicable to one or more data processing systems. However, other examples having to do with any other type of business operations, or data not pertaining business operations, are also possible.

In one example, the select application dialog box 502 represents a type of "app store" by which the user may select one or more different preprogrammed data display applications 308 for inclusion in a particular dashboard container application 306. As a result, each of the data display applications 308 may be incorporated into multiple dashboard container applications 306 associated with multiple users, thus promoting the reusability of the individual data display applications 308, and reducing the overall amount of programming involved in providing personalized dashboards displayed to multiple users.

In other examples, other types of modification of the configuration data for a dashboard container application 306 and included data display applications 308, such as formatting of the data as presented, filters for preventing certain data from being shown, and other modifications, may be entered by the user in a fashion similar to that shown in FIG. 5, such as by way of dialog boxes or other graphical structures that may be provided by way of a webpage or other communication means.

Figure 6:
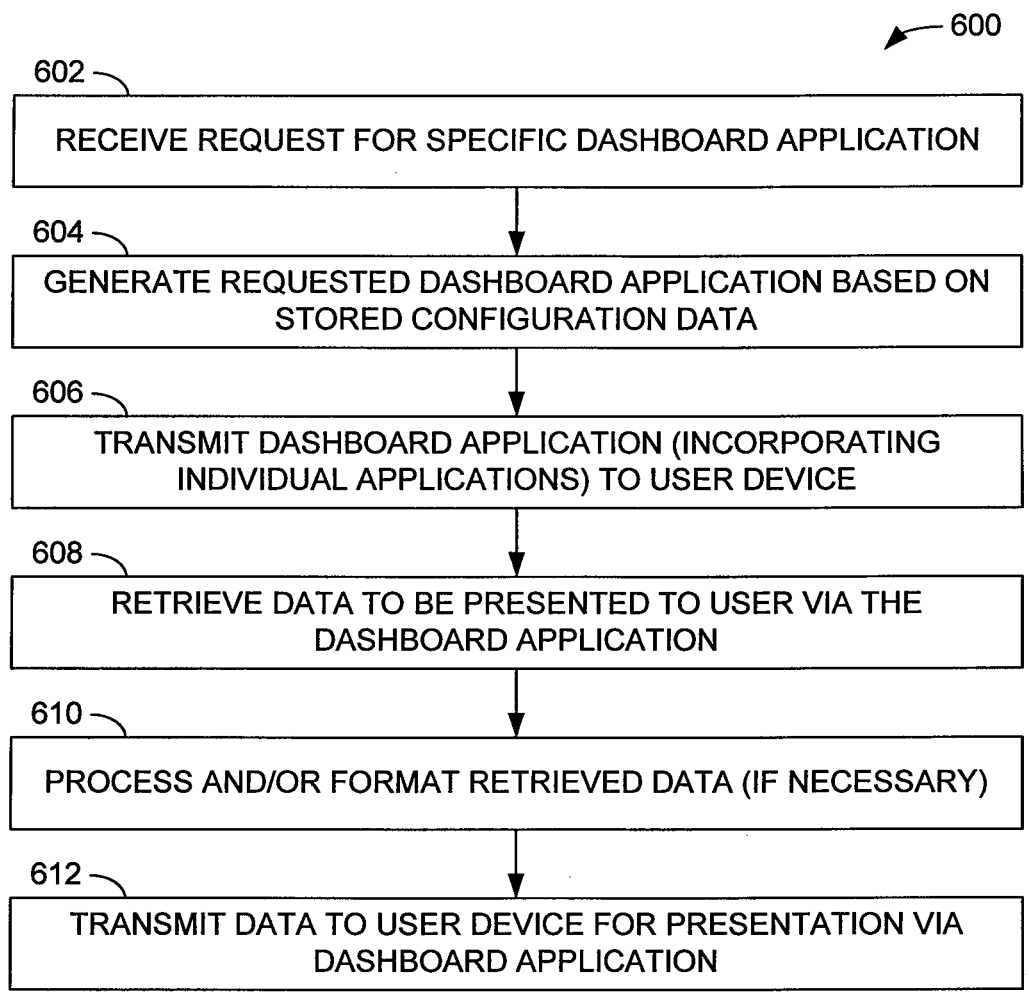
FIG. 6 is a flow diagram of an example method of presenting a requested personalized dashboard display.

FIG. 6 is a flow diagram of a method 600 for presenting a requested personalized dashboard display to a user. In the method 600, a request for a specific dashboard container application 306 may be received (operation 602). In response to the request, the requested dashboard container 306 may be generated using the corresponding configuration data 328, 330 for the dashboard container 306 and incorporated data display applications 308 (operation 604). The generated dashboard container application 306 and included individual data display applications 308 may then be transmitted to the user device 104 of FIG. 1 (operation 606). Data to be presented to the user via the dashboard container application 306 and included data display applications 308 may then be retrieved via the content interface 322 of FIG. 3 (operation 608). The retrieved data may then be processed and/or formatted as determined by the dashboard container application 306 and data display applications 308 (operation 610). The processed data may then be transmitted to the user device 104 for presentation via the dashboard container application 306 (operation 612).

Figure 7:
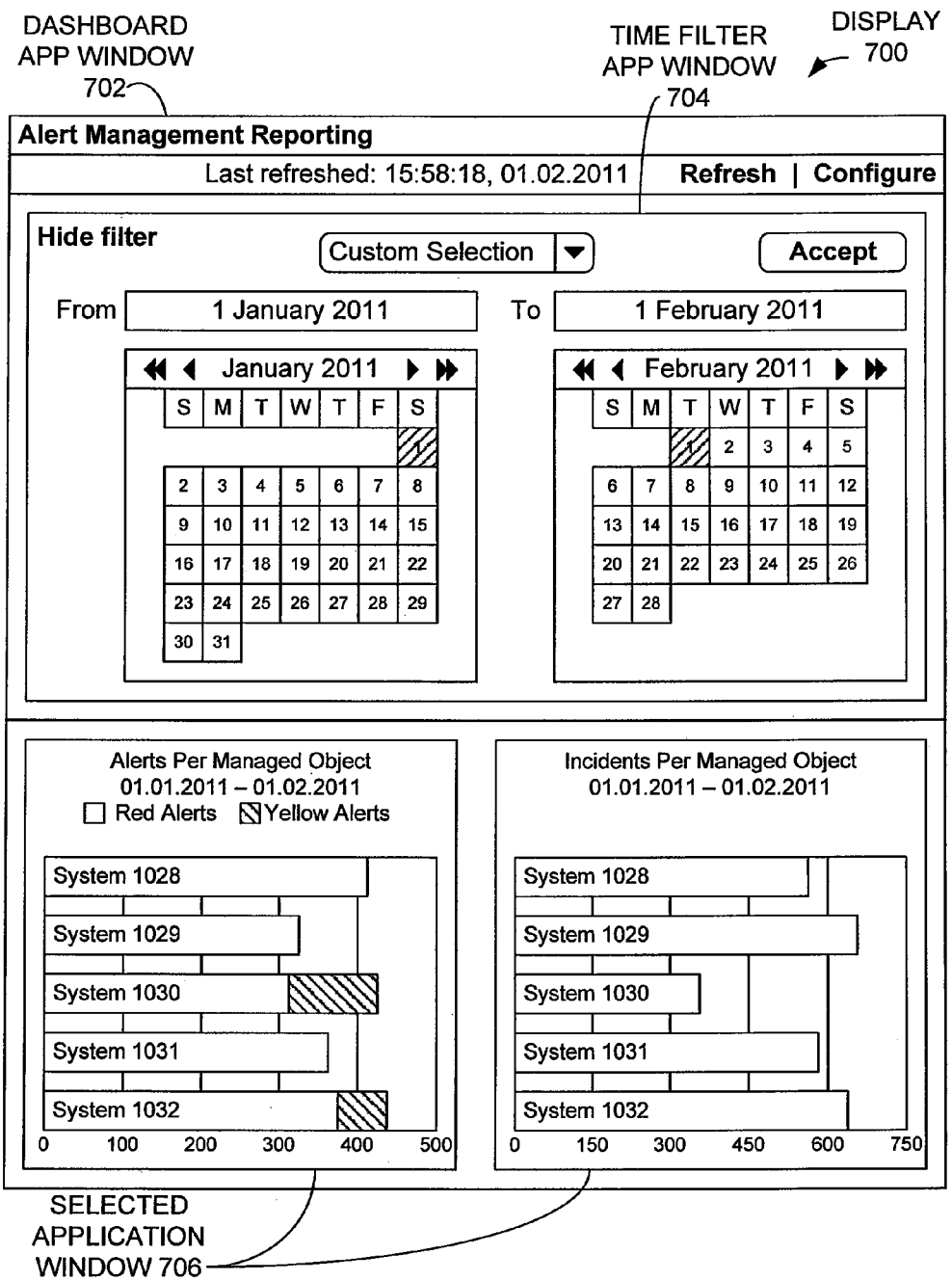
FIG. 7 is a graphical representation of an example personalized dashboard display.

FIG. 7 is a graphical representation of an example display 700 for a graphical dashboard application window 702 of a dashboard container application 306, presented as a result of the method 600 of FIG. 6. In one example, the display 700 may be provided to the user device 104 by way of a webpage access. Within the dashboard application window 702 (labeled as "Alert Management Reporting") are three windows, one for each data display application 308 selected for inclusion within the dashboard container application 306.

More specifically, included in the dashboard application window 702 are selected application windows 706 for the "alerts per managed object" application and the "incidents per managed object" application, both of which may have been selected via the "Select Application" dialog box 502 of FIG. 5. Also included in the dashboard application window 702 may be a time filter application window 704 that determines the time period applicable to the data to be presented in the selected application windows 706. In some examples, the time filter application is explicitly selected by the user for inclusion in the dashboard container application 306, while in other implementations, the time filter application may be included automatically as a result of the user selecting one or both of the "Alerts per Managed Object" or "Incidents per Managed Object" applications 306 for inclusion in the dashboard container application 306.

The time filter application is one example of an application which may produce data which is then employed as input data for another included data display application 308. In this example, the time filter application provides a time period for which the data for the selected application windows 706 are to be retrieved. As shown in FIG. 7, the user can select a number of formats via a dropdown menu by which to input the time period. In this particular example, the user has chosen a "Custom Selection" format, which causes the presentation of two calendars (one for the beginning day and another for the ending day of the selected time period). In FIG. 7, the user has selected 1 Jan. 2011 as the first day of the time period, and 1 Feb. 2011 as the last day of the period via the displayed calendars. By then activating the "Accept" button, the selected time period is applied to the other selected data display applications 308. The user may thereafter activate the "Hide filter" selection within the time filter application window 704 to minimize or remove the time filter application window 704 to create more display area for the remaining selected application windows 706. In some examples, the time filter application represents just one type of data display application 308 which may provide input data, configuration data, or input parameters to other selected data display applications 308.

The selected application windows 706 of FIG. 7 provide information based on the data corresponding to the selected data display applications 308 over the time period selected via the time filter application. In this particular example, the time period is noted in each of the selected application windows 706. In each of the selected application windows 706, a number of events (for example, red alerts yellow alerts, or incidents) are displayed via a bar graph, wherein each bar corresponds to a particular data processing system (for example, System 1028, System 1029, and so on). In other examples, other graphical means of presenting this information, such as by way of a chart or table, may be utilized in each of the selected application windows 706.

In one implementation, the systems for which the various events are to be retrieved and displayed are determined by way of user-determined configuration data 330 for each of the individual data display applications 308. In another example, the systems may be selected by way of a separate data display application 308 that filters or limits the data to be retrieved to those specific systems, analogous to how the time filter application restricts the data to a user-determined time period.

In some embodiments, two or more of the selected data display applications 308 may be separate instances of the same data display application 308, distinguished by way of the data being presented, or by way of how the data is formatted. For example, one instance of a data display application 308 may present data corresponding to a different time period than that associated with another instance of the same data display application 308. In another example, one instance may pertain to one set of data processing systems (for example, Systems 1028-1032), while another instance of the same data display application 308 may be associated with another set of systems (for example, Systems 1033-1037). In yet other implementations, two instances of the same data display application 308 may present the same data in different formats, such as, for example, by way of bar graphs and pie charts. Other reasons for selecting multiple instances of the same data display application 308 for display within a single dashboard application window 702 are also possible.

In one example, while perusing the dashboard application window 702, the user may select a particular data display application window 706 to be magnified or expanded on the display 700 temporarily to obtain a closer view of the information provided therein.

In the example of FIG. 7, the dashboard application window 702 may provide the user the ability to refresh, update, or renew the data being presented in the selected application windows 706 by way of a "Refresh" selector. In addition, the dashboard application window 702 may indicate the time at which the selected application windows 706 were refreshed. Also, the dashboard application window 702 may provide a "Configure" selector, as depicted in FIG. 7, which may allow the user to add or remove various data display applications 308 from the dashboard container application 306, set various parameters or configuration data, and the like, such as by way of the dialog box 502 of FIG. 5.

In one example, the user device 104 only needs the execution client 310 (FIG. 3) to execute the dashboard container application 306 to present the dashboard application window 702 to the user. Further, once the dashboard container application 306 completes execution, such as, for example, by way of the user terminating the dashboard container application 306 on the user device 104, the dashboard container application 306, including all data display applications 308 incorporated therein, may be deleted from the user device 104.

Based on at least some of the implementations described herein, a user may access one or more dashboard displays, such as by way of the Internet or another communication network or connection, that the user is capable of personalizing to meet the individual needs of the user. Further, such a display may be constructed by identifying multiple previously programmed data display applications for inclusion in the display, and configuring the individual applications and the dashboard container according to individual preferences. Further, the display may be accessed using a number of different devices using diverse interface technologies, thus enhancing the overall accessibility of the display for the user. Such capability may be achieved without loading or installing any additional software on the user device being utilized to view the dashboard.

Figure 8:
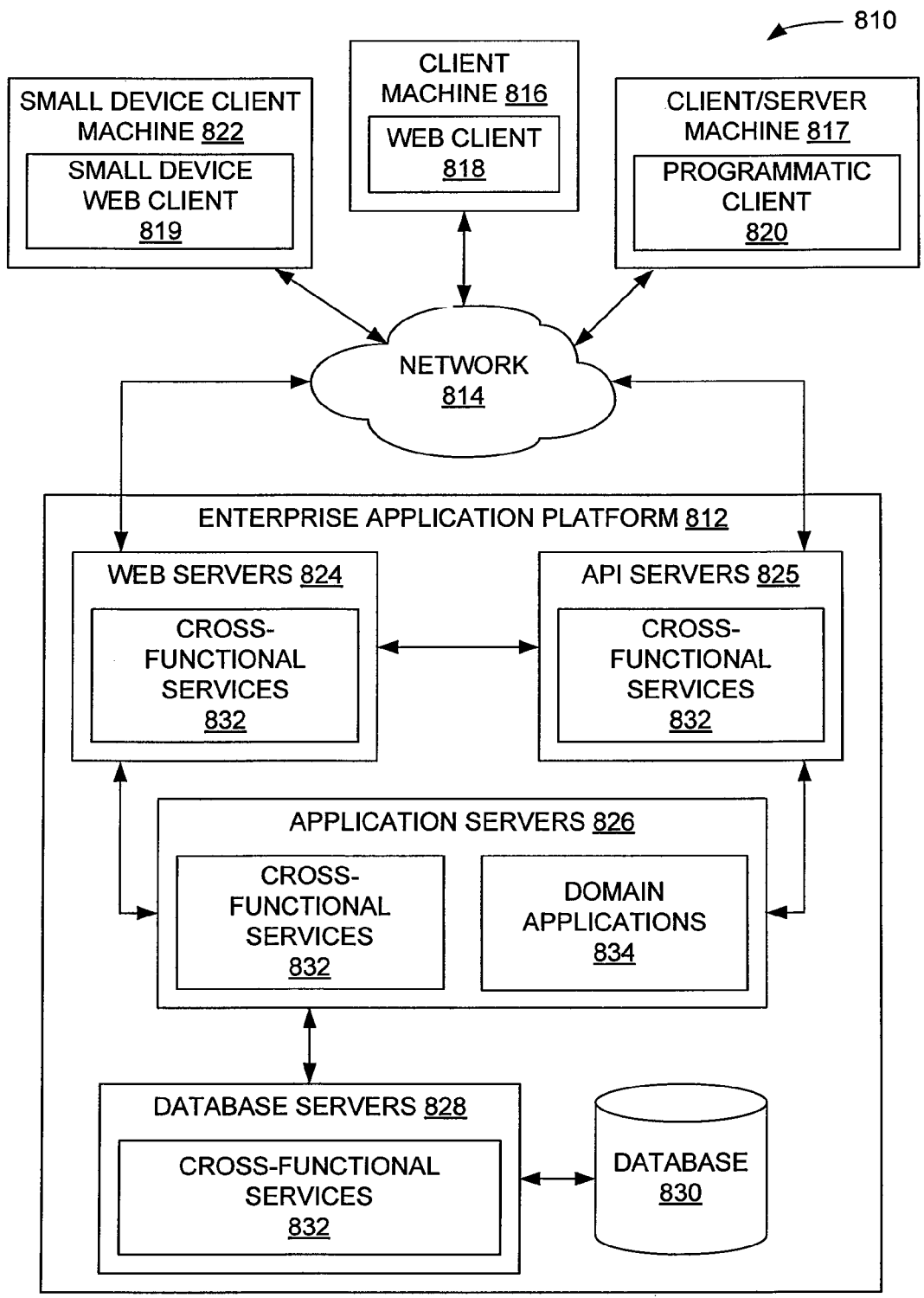
FIG. 8 is a block diagram of an example system having a client-server architecture for an enterprise application platform capable of employing the systems and methods described herein.

FIG. 8 is a network diagram depicting an example system 810, according to one exemplary embodiment, having a client-server architecture configured to perform the various methods described herein. A platform (e.g., machines and software), in the exemplary form of an enterprise application platform 812, provides server-side functionality via a network 814 (e.g., the Internet) to one or more clients. FIG. 8 illustrates, for example, a client machine 816 with a web client 818 (e.g., a browser, such as the INTERNET EXPLORER browser developed by Microsoft Corporation of Redmond, Wash. State), a small device client machine 822 with a small device web client 819 (e.g., a browser without a script engine) and a client/server machine 817 with a programmatic client 820.

Turning specifically to the enterprise application platform 812, web servers 824, and Application Program Interface (API) servers 825 are coupled to, and provide web and programmatic interfaces to, application servers 826. The application servers 826 are, in turn, shown to be coupled to one or more database servers 828 that may facilitate access to one or more databases 830. The web servers 824, Application Program Interface (API) servers 825, application servers 826, and database servers 828 may host cross-functional services 832. The application servers 826 may further host domain applications 834.

The cross-functional services 832 may provide user services and processes that utilize the enterprise application platform 812. For example, the cross-functional services 832 may provide portal services (e.g., web services), database services, and connectivity to the domain applications 834 for users that operate the client machine 816, the client/server machine 817, and the small device client machine 822. In addition, the cross-functional services 832 may provide an environment for delivering enhancements to existing applications and for integrating third-party and legacy applications with existing cross-functional services 832 and domain applications 834. Further, while the system 810 shown in FIG. 8 employs a client-server architecture, the present disclosure is of course not limited to such an architecture, and could equally well find application in a distributed, or peer-to-peer, architecture system.

Figure 9:
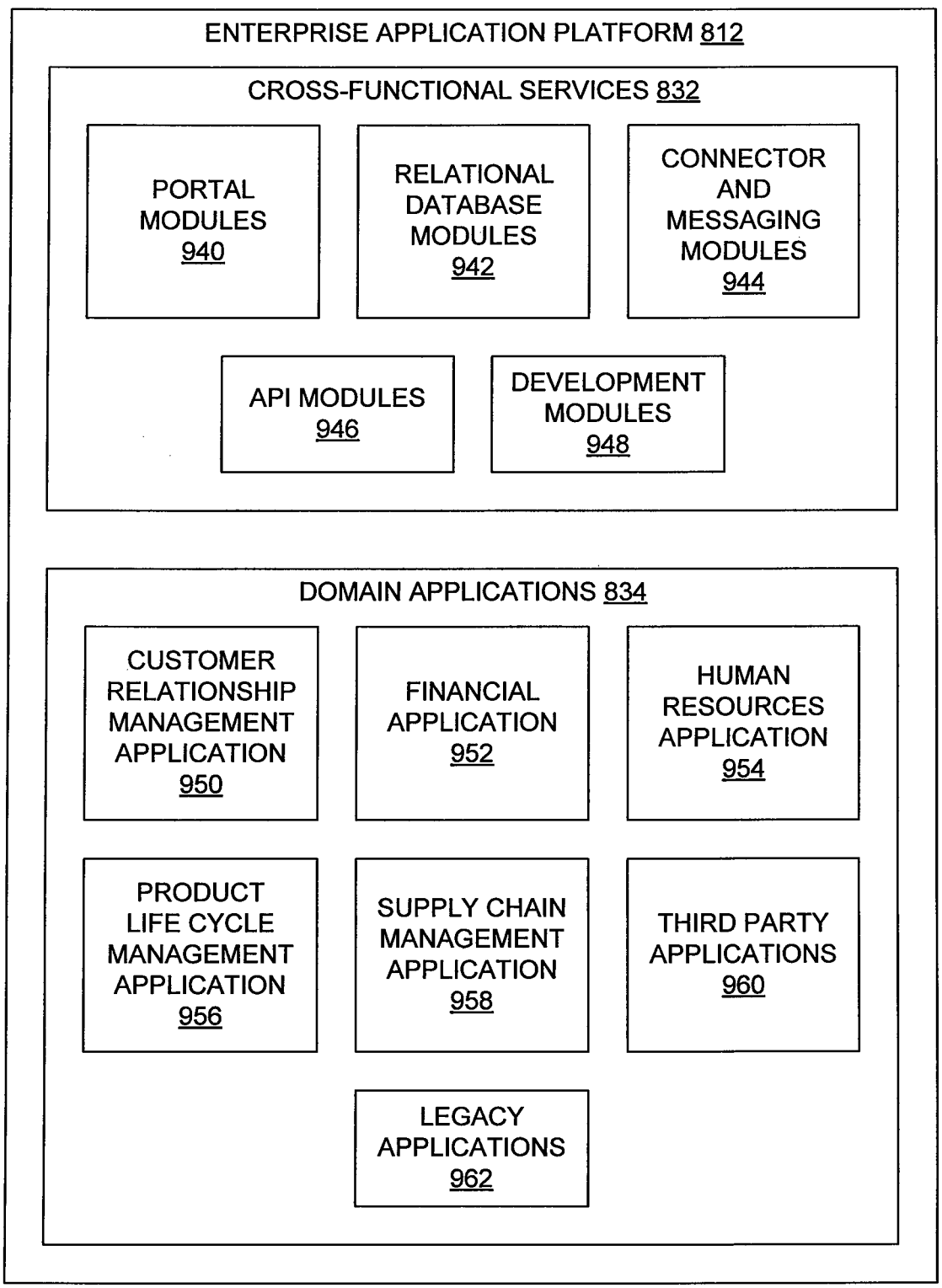
FIG. 9 is a block diagram of example applications and modules employable in the enterprise application platform of FIG. 8.

FIG. 9 is a block diagram illustrating example enterprise applications and services, such as those described herein, as embodied in the enterprise application platform 812, according to an exemplary embodiment. The enterprise application platform 812 includes cross-functional services 832 and domain applications 834. The cross-functional services 832 include portal modules 940, relational database modules 942, connector and messaging modules 944, Application Program Interface (API) modules 946, and development modules 948.

The portal modules 940 may enable a single point of access to other cross-functional services 832 and domain applications 834 for the client machine 816, the small device client machine 822, and the client/server machine 817. The portal modules 940 may be utilized to process, author, and maintain web pages that present content (e.g., user interface elements and navigational controls) to the user. In addition, the portal modules 940 may enable user roles, a construct that associates a role with a specialized environment that is utilized by a user to execute tasks, utilize services, and exchange information with other users and within a defined scope. For example, the role may determine the content that is available to the user and the activities that the user may perform. The portal modules 940 may include, in one implementation, a generation module, a communication module, a receiving module, and a regenerating module. In addition, the portal modules 940 may comply with web services standards and/or utilize a variety of Internet technologies, including, but not limited to, Java, J2EE, SAP's Advanced Business Application Programming Language (ABAP) and Web Dynpro, XML, JCA, JAAS, X.509, LDAP, WSDL, WSRR, SOAP, UDDI, and Microsoft .NET.

The relational database modules 942 may provide support services for access to the database 830 (FIG. 8) that includes a user interface library. The relational database modules 942 may provide support for object relational mapping, database independence, and distributed computing. The relational database modules 942 may be utilized to add, delete, update, and manage database elements. In addition, the relational database modules 942 may comply with database standards and/or utilize a variety of database technologies including, but not limited to, SQL, SQLDBC, Oracle, MySQL, Unicode, and JDBC.

The connector and messaging modules 944 may enable communication across different types of messaging systems that are utilized by the cross-functional services 832 and the domain applications 834 by providing a common messaging application processing interface. The connector and messaging modules 944 may enable asynchronous communication on the enterprise application platform 812.

The Application Program Interface (API) modules 946 may enable the development of service-based applications by exposing an interface to existing and new applications as services. Repositories may be included in the platform as a central place to find available services when building applications.

The development modules 948 may provide a development environment for the addition, integration, updating, and extension of software components on the enterprise application platform 812 without impacting existing cross-functional services 832 and domain applications 834.

Turning to the domain applications 834, the customer relationship management applications 950 may enable access to and facilitate collecting and storing of relevant personalized information from multiple data sources and business processes. Enterprise personnel that are tasked with developing a buyer into a long-term customer may utilize the customer relationship management applications 950 to provide assistance to the buyer throughout a customer engagement cycle.

Enterprise personnel may utilize the financial applications 952 and business processes to track and control financial transactions within the enterprise application platform 812. The financial applications 952 may facilitate the execution of operational, analytical and collaborative tasks that are associated with financial management. Specifically, the financial applications 952 may enable the performance of tasks related to financial accountability, planning, forecasting, and managing the cost of finance.

The human resources applications 954 may be utilized by enterprise personal and business processes to manage, deploy, and track enterprise personnel. Specifically, the human resources applications 954 may enable the analysis of human resource issues and facilitate human resource decisions based on real-time information.

The product life cycle management applications 956 may enable the management of a product throughout the life cycle of the product. For example, the product life cycle management applications 956 may enable collaborative engineering, custom product development, project management, asset management, and quality management among business partners.

The supply chain management applications 958 may enable monitoring of performances that are observed in supply chains. The supply chain management applications 958 may facilitate adherence to production plans and on-time delivery of products and services.

The third-party applications 960, as well as legacy applications 962, may be integrated with domain applications 834 and utilize cross-functional services 832 on the enterprise application platform 812.

Figure 10:
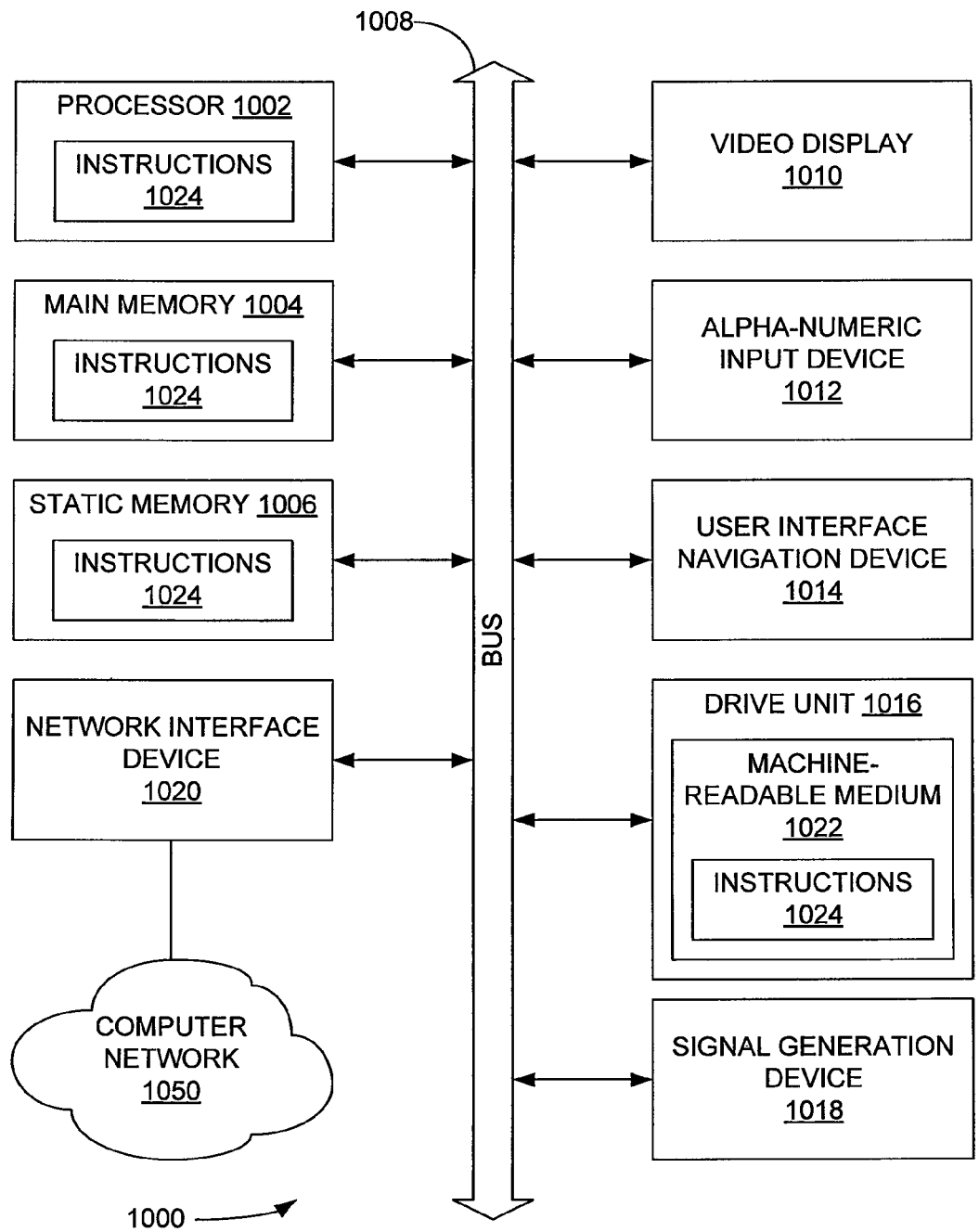
FIG. 10 is a block diagram of a machine in the example form of a processing system within which may be executed a set of instructions for causing the machine to perform any one or more of the methodologies discussed herein.

FIG. 10 depicts a block diagram of a machine in the example form of a processing system 1000 within which may be executed a set of instructions for causing the machine to perform any one or more of the methodologies discussed herein. In alternative embodiments, the machine operates as a standalone device or may be connected (for example, networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 1000 includes a processor 1002 (for example, a central processing unit (CPU), a graphics processing unit (GPU), or both), a main memory 1004 (for example, random access memory), and static memory 1006 (for example, static random-access memory), which communicate with each other via bus 1008. The processing system 1000 may further include video display unit 1010 (for example, a plasma display, a liquid crystal display (LCD), or a cathode ray tube (CRT)). The processing system 1000 also includes an alphanumeric input device 1012 (for example, a keyboard), a user interface (UI) navigation device 1014 (for example, a mouse), a disk drive unit 1016, a signal generation device 1018 (for example, a speaker), and a network interface device 1020.

The disk drive unit 1016 (a type of non-volatile memory storage) includes a machine-readable medium 1022 on which is stored one or more sets of data structures and instructions 1024 (for example, software) embodying or utilized by any one or more of the methodologies or functions described herein. The data structures and instructions 1024 may also reside, completely or at least partially, within the main memory 1004, the static memory 1006, and/or within the processor 1002 during execution thereof by processing system 1000, with the main memory 1004 and processor 1002 also constituting machine-readable, tangible media.

The data structures and instructions 1024 may further be transmitted or received over a computer network 1050 via network interface device 1020 utilizing any one of a number of well-known transfer protocols (for example, HyperText Transfer Protocol (HTTP)).

Certain embodiments are described herein as including logic or a number of components, modules, or mechanisms. Modules may constitute either software modules (for example, code embodied on a machine-readable medium or in a transmission signal) or hardware modules. A hardware module is a tangible unit capable of performing certain operations and may be configured or arranged in a certain manner. In example embodiments, one or more computer systems (for example, the processing system 1000) or one or more hardware modules of a computer system (for example, a processor 1002 or a group of processors) may be configured by software (for example, an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 1002 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (for example, hardwired) or temporarily configured (for example, programmed) to operate in a certain manner and/or to perform certain operations described herein. Considering embodiments in which hardware modules are temporarily configured (for example, programmed), each of the hardware modules need not be configured or instantiated at any one instance in time. For example, where the hardware modules include a general-purpose processor 1002 that is configured using software, the general-purpose processor 1002 may be configured as respective different hardware modules at different times. Software may accordingly configure a processor 1002, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 1002 that are temporarily configured (for example, by software) or permanently configured to perform the relevant operations. Whether temporarily or permanently configured, such processors 1002 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 1002 or processor-implemented modules. The performance of certain of the operations may be distributed among the one or more processors 1002, not only residing within a single machine but deployed across a number of machines. In some example embodiments, the processors 1002 may be located in a single location (for example, within a home environment, within an office environment, or as a server farm), while in other embodiments, the processors 1002 may be distributed across a number of locations.

While the embodiments are described with reference to various implementations and exploitations, it will be understood that these embodiments are illustrative and that the scope of claims provided below is not limited to the embodiments described herein. In general, the techniques and methodologies described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method, executed at a server, comprising:
   transmitting to a user device an identity of each of a plurality of data display applications, the user device located on a separate physical device from the server, each of the plurality of data display applications to display data within a dashboard application;

receiving from the user device selections of more than one of the plurality of data display applications;
generating configuration data indicating the selected data display applications; storing the configuration data;
maintaining an internal representation of the dashboard application as well as internal representations of the selected data display applications;
receiving from the user device a request for a presentation application, the presentation application to display the data via execution of the selected data display applications;
in response to the request, generating the presentation application based on the configuration data, the presentation application comprising the selected data display applications, the generating of the presentation application being performed by at least one processor of a machine;
transmitting to the user device the presentation application;
receiving one or more requests for data from the selected data display applications in the presentation application operating on the user device; and
serving data in response to the one or more requests from one or more data sources based on the internal representation of the selected data display application stored by the application provisioning module.

2. The method of claim 1, the selections of the more than one application comprising identification of the data to be presented on the user device via at least one of the selected applications.

3. The method of claim 1, the selections of the more than one application comprising identification of a visual format of the data to be presented on the user device via at least one of the selected applications.

4. The method of claim 1, the configuration data comprising data for configuring each of the selected applications, and data for configuring the presentation application.

5. The method of claim 1, the selections of the more than one application comprising multiple selections of one of the plurality of applications, and the configuration data comprising data for configuring each of the multiple selections of the one of the plurality of applications.

6. The method of claim 1, the presentation application comprising an executable file that is deleted from the user device upon completion of execution on the user device.

7. The method of claim 1, the request from the user device for the presentation application comprising a request to access a web page corresponding to the presentation application.

8. The method of claim 1, the presentation application comprising an additional application to provide input to at least one of the selected applications.

9. The method of claim 8, the additional application to receive an input entered on the user device to specify a time period, and to direct the at least one of the selected applications to display data corresponding to the specified time period.

10. The method of claim 1, further comprising:
in response to the user device initiating execution of the presentation application, accessing the data to be displayed by each of the selected data display applications; and
transmitting the accessed data to the user device.

11. The method of claim 10, the accessing of the data to be displayed comprising:
generating at least one query corresponding to the data to be displayed via each of the selected applications;
transmitting the at least one query to a database system; and
receiving at least one response to the at least one query from the database system, the data to be displayed being based on the at least one response.

12. The method of claim 1, the method comprising:
receiving from a second user device a second request for the presentation application; and
in response to the second request, generating the presentation application based on the configuration data; and
transmitting to the second user device the presentation application.

13. A system comprising:
a communication interface;
data storage; and
at least one processor configured to execute instructions of a plurality of modules, the modules comprising:
an interface module to transmit an identity of each of a plurality of data display applications via the communication interface to a user device, the user device located on a separate physical device from the system, each of the plurality of data display applications to display data within a dashboard application, the interface module to receive from the user device via the communication interface selections of more than one of the plurality of data display applications;
an application provisioning module to generate configuration data indicating the selected data display applications and to maintain an internal representation of the dashboard application as well as internal representations of the selected data display applications; and
an application persistence module to store the configuration data and the selected data display applications in the data storage;
the interface module to receive a request for a presentation application from the user device via the communication interface, the presentation application to display the data via execution of the selected data display applications;
the application provisioning module to generate the presentation application based on the configuration data from the application persistence module in response to the request, the presentation application comprising the selected applications; the interface module to transmit the presentation application via the communication interface to the user device; and
the interface module to receive one or more requests for data from the selected data display applications in the presentation application operating on the user device, and to serve data in response to the one or more requests from one or more data sources based on the internal representation of the selected data display application stored by the application provisioning module.

14. The system of claim 13, the request comprising a web page access by a web browser executing on the user device, and the presentation application comprising an executable file transmitted via the communication interface to the user device in response to the web page access.

15. The system of claim 14, the executable file to be executed by the web browser.

16. The system of claim 13, the application provisioning module to access the data to be displayed by each of the selected data display applications in response to the user device initiating execution of the presentation application, and the interface module to transmit the accessed data to the user device.

17. The system of claim 16, the application provisioning module to process the accessed data prior to the interface module transmitting the accessed data to the user device, the processing of the accessed data comprising at least one of filtering, correlating, and aggregating the accessed data.

18. The system of claim 16, the application provisioning module to access the data to be displayed by retrieving the data from a spreadsheet file.

19. The system of claim 16, the application provisioning module to access the data to be displayed by generating at least one query corresponding to the data to be displayed via each of the selected data display applications, transmitting the at least one query to a database system, and receiving at least one response to the at least one query from the database system, the data to be displayed being based on the at least one response.

20. The system of claim 16, wherein the utilizing of the internal representation of the: particular data display application when handling a data request from the particular data display application executing within the dashboard application on the user device includes determining, suing the internal representation, a format of data for transmission via the interface module.

21. The system of claim 13, the interface module to receive from a second user device a second request for the presentation application, the application provisioning module to generate the presentation application based on the configuration data from the application persistence module, and the interface module to transmit the presentation application to the second user device.

22. The system of claim 13, wherein the utilizing of the internal representation of the particular data display application when handling a data requested from the particular data display application executing within the dashboard application on the user device includes determining, using the internal representation, a type of processing to be applied to the retrieved data.

23. A non-transitory computer-readable storage medium comprising instructions that, when executed by at least one processor of a server, cause the server to perform operations comprising:
  transmitting to a user device an identity of each of a plurality of data display applications, the user device located on a separate physical device from the server, each of the plurality of data display applications to display data within a dashboard application;
  receiving from the user device selections of more than one of the plurality of data display applications;
  generating configuration data indicating the selected data display applications; storing the configuration data;
  maintaining an internal representation of the dashboard application as well as internal representations of the selected data display applications;
  receiving from the user device a request for a presentation application, the presentation application to display the data via execution of the selected data display applications;
  in response to the request, generating the presentation application based on the configuration data, the presentation application comprising the selected data display applications;
  transmitting to the user device the presentation application;
  receiving one or more requests for data from the selected data display applications in the presentation application operating on the user device; and
  serving data in response to the one or more requests from one or more data sources based on the internal representation of the selected data display application stored by the application provisioning module.

24. The system of claim 13, wherein the one or more data sources include a relational database.

25. The system of claim 13, wherein the one or more data sources include a data warehouse.

* * * * *